United States Patent
Nonaka et al.

(10) Patent No.: US 6,652,694 B1
(45) Date of Patent: Nov. 25, 2003

(54) PHOTOCURABLE RESIN COMPOUND AND METHOD OF CURING THE SAME

(75) Inventors: Shinichi Nonaka, Osaka (JP); Takashi Tomiyama, Osaka (JP); Shigeru Motomiya, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 117 days.

(21) Appl. No.: 09/649,068

(22) Filed: Aug. 29, 2000

(30) Foreign Application Priority Data

Aug. 31, 1999 (JP) .......................... 11-245172

(51) Int. Cl.$^7$ .................. B32B 31/04; B32B 31/28; B32B 33/00
(52) U.S. Cl. .................. 156/182; 156/247; 156/272.2; 156/275.5; 428/41.5; 428/41.7; 428/113; 428/351; 428/364; 522/913
(58) Field of Search .................. 428/298.1, 300.7, 428/319.3, 351, 354, 364, 41.5, 41.7, 113, 35.9, 36.1, 41.8, 41.9, 42.3, 74, 141; 522/913; 156/182, 247, 272.2, 62.2, 71, 184, 242, 243, 244.11, 244.12, 249, 272.6, 273.3, 273.5, 275.5, 276, 279, 289; 264/112, 131, 133, 135, 136, 241, 257, 266, 275, 308, 311.11, 311.15, 463, 479, 480, 483, 454, DIG. 57

(56) References Cited

U.S. PATENT DOCUMENTS 5,747,553 A * 5/1998 Guzauskas .................. 523/115
5,935,683 A * 8/1999 Iiyama et al. .................. 156/71
6,284,431 B1 * 9/2001 Tanizaki et al. ......... 430/270.1
6,316,089 B1 * 11/2001 Ohtani et al. ............... 264/135
6,440,551 B1 * 8/2002 Enniss et al. ............... 428/323

FOREIGN PATENT DOCUMENTS

| EP | 0 803 531 A2 | 10/1997 |
| GB | 1198316 | 7/1970 |

OTHER PUBLICATIONS

European Search Report dated Aug. 21, 2001.

* cited by examiner

Primary Examiner—Curtis Mayes
Assistant Examiner—Sing P Chan
(74) Attorney, Agent, or Firm—Armstrong, Westerman & Hattori, LLP

(57) ABSTRACT

A sheet-like photocurable resin compound can secure or control a sufficient application time outdoors where the compound is irradiated with natural light and can suppress volatilization of a styrene monomer. This sheet-like photocurable resin compound comprises a photocurable resin compound (i) containing as an essential component at least one unsaturated resin (A) selected from the group consisting of unsaturated polyester resin, vinyl ester resin, vinyl urethane resin, and acrylic resin, a photopolymerization initiator (B) which is not activated by irradiation with light with a wavelength of 420 nm or above, and a thickener (C) containing a thermnoplastic resin powder as an active component; and a see-through light absorbing film (ii) whose transmittance to light with a wavelength of 420 nm or below is 10% or less; said photocurable resin compound being covered with said see-through absorbing film.

18 Claims, No Drawings

US 6,652,694 B1

PHOTOCURABLE RESIN COMPOUND AND METHOD OF CURING THE SAME

BACKGROUND OF THE INVENTION

1. Field of the Invention

The present invention relates to a sheet-like photocurable resin compound which can be used for repair of water proof undercoatings such as those of roofs, parking lots, or floors, repair of wall materials and piping, repair and reinforcement of various structural members, and repair of boats, waterproof materials for tanks, or the like, and the present invention also relates to a method of curing the sheet-like photocurable resin compound.

2. Description of the Related Art

Photocurable resin compounds of the prior art are disclosed, for example, in Japanese Unexamined Patent Application, First Publication No. Sho 63-186744, Japanese Unexamined Patent Application, First Publication No. Hei 10-71661, Japanese Unexamined Patent Application, First Publication No. Hei 10-331345, and Japanese Unexamined Patent Application, First Publication No. Hei 10-339001. These photocurable resin compounds are used for repair or reinforcement of various piping materials and various structural members which are made of steel, concrete, and plastic, used as waterproof linings, and used for repair of automobiles and boats, waterproofing of roofs and tanks, and repair of surfboards and boats.

As a so-called lining application for civil engineering and construction, for example, waterproof coating of asphalt and lining with a vinyl chloride sheet have been carried out for applications requiring waterproofing. However, the waterproof effect is impaired within a short time because of low mechanical strength and drastic deterioration, thereby requiring frequent maintenance operations. There have been known techniques of forming waterproof layers by impregnating a glass fiber-chopped strand mat with an unsaturated polyester resin and curing it in the location of application, but this technique has the problem of adverse effects on the operating environment due to volatilization of volatile substances such as styrene monomers in the unsaturated polyester resin.

The above publications have been suggested as a means for solving the problems described above, however, with these techniques, it is impossible to secure sufficient operation time because in practice the application is often conducted outdoors where the compound is irradiated by sunlight, and even if it is possible to secure sufficient operation time, it is impossible to visually confirm whether the base material and photocurable resin compound are closely adhered to each other or bubbles have been sufficiently removed during the application because a laminate film of an aluminum foil is used as a light screening film. When applying to a wide area, it is impossible to secure enough time to attain close adhesion, thereby making it difficult to apply.

BRIEF SUMMARY OF THE INVENTION

An object of the present invention is to provide a sheet-like photocurable resin compound, which can provide sufficient application time, or allow control of the application time, outdoors under irradiation by natural light, and can suppress volatilization of a styrene monomer.

The present inventors have carried out intensive studies concerning sheet-like photocurable resin compounds prepared by protecting the resin compound, which contains a photopolymerization initiator having a specific absorption band and is capable of thickening, with a see-through light absorbing film having a specific absorption band, and thus completed the present invention.

That is, the present invention provides a sheet-like photocurable resin compound comprising a photocurable resin compound (i) containing as an essential component at least one unsaturated resin (A) selected from the group consisting of unsaturated polyester resin, vinyl ester resin, vinyl urethane resin, and acrylic resin, a photopolymerization initiator (B) which is not activated by irradiation with light with a wavelength of 420 nm or above, and a thickener (C) containing a thermoplastic resin powder as an active component; and a see-through light absorbing film (ii) whose transmittance to light with a wavelength of 420 nm or below is 10% or less; said photocurable resin compound being covered with said see-through absorbing film.

Preferably, the photocurable resin compound (i) contains a fiber reinforcement (E).

Preferably, the thickener (C) containing a thermoplastic resin powder as an active component is a polymer powder obtained by polymerizing an acrylic monomer.

Preferably, the thickener (C) containing a thermoplastic resin powder as an active component is a resin polymer powder having an average particle diameter within a range from 0.1 μm to 0.5mm.

Preferably, the thickener (C) containing a thermoplastic resin powder as an active component has a weight-average molecular weight of 100,000 or more.

Preferably, the transmittance to light with a wavelength of 420 nm or below is 10% or less, and said see-through light absorbing film (ii) is a thermoplastic film containing an ultraviolet absorber (D).

Preferably, the transmittance to light with a wavelength of 420 nm or below is 10% or less, and said see-through light absorbing film (ii) is a film obtained by coating a thermoplastic film with a coating composition containing an ultraviolet absorber (D).

Preferably, the transmittance to light with a wavelength of 420 nm or below is 10% or less, and said see-through light absorbing film (ii) is composed of a re-releasing adhesive containing an ultraviolet absorber (D) and a thermoplastic film.

The present invention also provides a method of curing a photocurable resin compound, which comprises shaping a photocurable resin compound while it is provided with a see-through light absorbing film (ii), removing said see-through light absorbing film (ii), and curing said photocurable resin compound by irradiating with ultraviolet light and/or natural light.

The present invention also provides a method of curing a photocurable resin compound, which comprises partially overlapping photocurable resin compounds one upon another while they are provided with a see-through light absorbing film (ii), thereby to integrate them, removing said see-through light absorbing film (ii), and curing said photocurable resin compound by irradiating with ultraviolet light and/or natural light.

The sheet-like photocurable resin compound of the present invention can provide sufficient application time even for outdoor application, and can be quickly cured by peeling off the light absorbing layer when necessary. Furthermore, the sheet-like photocurable resin compound can be applied to a large area, and can drastically reduce volatilization of styrene and provide the standing surface with a FRP layer having a uniform thickness.

DETAILED DESCRIPTION OF THE INVENTION

The present invention will now be described in detail.

The unsaturated polyester resin as the resin (A) selected from the group consisting of unsaturated polyester resin, vinyl ester resin, vinyl urethane resin, and acrylic resin is not specifically limited, there can be used known unsaturated polyester resins which have commonly been used in unsaturated polyester resin molded articles. The unsaturated polyester resin is prepared by dissolving an unsaturated polyester, which is obtained by the condensation reaction between an α,β-unsaturated carboxylic acid or an α,β-unsaturated carboxylic acid containing in some cases a saturated carboxylic acid and alcohols, in a polymerizale monomer.

The α,β-unsaturated carboxylic acid includes, for example, fumaric acid, maleic acid, maleic anhydride, itaconic acid, citraconic acid, mesaconic acid, chloromaleic acid, or dimethyl esters thereof. These α,β-unsaturated carboxylic acids may be used alone, or two or more kinds of them may be used in combination. The unsaturated carboxylic acid includes, for example, phthalic acid, phthalic anhydride, isophthalic acid, terephthalic acid, HET acid, hexahydrophthalic anhydride, adipic acid, sebacic acid, or azelaic acid. These saturated carboxylic acids may be used alone, or two or more kinds of them may be used in combination.

The alcohols include, for example, diols such as ethylene glycol, diethylene glycol, propylene glycol, dipropylene glycol, triethylene glycol, 1,3-butanediol, 1,4-butanediol, 1,3-pentanediol, 1,6-hexanediol, cyclohexanediol, neopentyl glycol, 2,2,4-trimethyl-1,3-pentanediol, glycerin monoallyl ether, hydrogenated bisphenol A, 2,2-bis(4-hydroxypropoxyphenyl)propane, and 2,2-bis(4-hydroxyethoxyphenyl)propane; triols such as trimethylolpropane; and tetraols such as pentaerythritol. These alcohols may be used alone, or two or more kinds of them may be used in combination.

The unsaturated polyester is dissolved in a solution of a polymerizale monomer described above, which is used as the unsaturated polyester resin. With respect to the mixing proportion, the amount of the unsaturated polyester is preferably within a range from 40 to 80% by weight based on 60 to 20% by weight the polymerizale monomer.

When using oxides of alkali earth metals which are used commonly as thickeners, the molecular weight of the unsaturated polyester must be about 2000 or more. Since the thickener (C) containing a thermoplastic resin powder in the present invention is used as an active component, an unsaturated polyester having a molecular weight within a range from 500 to 2000 can also be formed into a sheet.

The vinyl ester resin is prepared most typically by the reaction between an epoxy resin and acrylic acid or methacrylic acid, and also includes, for example, polybutadiene type vinyl ester resins prepared by the reaction between a carboxy-terminated polybutadiene and glycidyl methacrylate. The vinyl ester resin is a solution of a polymerizable monomer described hereinafter. With respect to the mixing proportion, the amount of the vinyl ester resin is preferably within a range from 40 to 80% by weight based on 60 to 20% by weight the polymerizable monomer.

The acrylic resin is composed of a thermoplastic acrylic polymer derived from a polymerizable monomer containing methacrylate or acrylate as a principal component, and a polymerizable monomer. The monomer used in the polymer is obtained by using (meth)acrylates such as methyl (meth)acrylate, ethyl (meth)acrylate, propyl (meth)acrylate, isopropyl (meth)acrylate, butyl (meth)acrylate, isobutyl (meth)acrylate, and cyclohexyl (meth)acrylate as an essential component, optionally using it in combination with another polymerizable monomer capable of copolymerizing with the (meth)acrylates described above, and polymerizing the mixed solution of the monomers described above.

As the polymerizable monomer capable of copolymerizing, 15 there can be used unsaturated monomers, for example, hydroxyl group-containing monomer such as hydroxyethyl (meth)acrylate, hydroxypropyl (meth)acrylate, and hydroxybutyl (meth)acrylate; and carboxyl group-containing monomers such as (meth)acrylic acid. Furthermore, other (meth)acrylates, aromatic monomers (e.g., styrene, a-methylstyrene, vinyl toluene, p-methylstyrene, chlorostyrene, etc.), vinyl esters (e.g., vinyl acetate, vinyl propionate, etc.), halogenated vinyl monomer (e.g., vinyl chloride, vinylidene chloride, etc.), and unsaturated nitriles (e.g., acrylonitrile, methacrylonitrile, etc.) can be used in combination.

The acrylic resin preferably has a molecular weight of 100,000 or less because it is used in the form of a syrup prepared by dissolving it in the polymerizable monomer, and can be obtained by general polymerization methods such as suspension polymerization and solution polymerization. A syrup prepared by pre-polymerization (a polymerization degree of 10 to 40%) of the monomer can be used as it is.

The vinyl urethane resin is prepared by dissolving an oligomer obtained from polyols (e.g., polyester, polyether, etc.), isocyanates, and hydroxyl group-containing (meth)acrylates in a polymerizable monomer solvent. As the polymerizable monomer, for example, the above polymerizable unsaturated monomer used in the acrylic resin can be used.

As the polymerizable monomer, which serves as a resin solvent and a polymer component in the resin (A), one or more (meth)acrylates selected from methyl (meth)acrylate, ethyl (meth)acrylate, propyl (meth)acrylate, isopropyl (meth)acrylate, butyl (meth)acrylate, isobutyl (meth)acrylate, cyclohexyl (meth)acrylate, and methyl (meth)acrylate are used as an essential component in case of the acrylic resin. Furthermore, other polymerizable monomers include, for example, (meth)acrylate having a $C^{1-12}$ alkyl group, styrene, α-methylstyrene, amide (meth)acrylate, maleate having a $C_{1-14}$ alkyl group, and fumarate.

Polyfunctional polymerizable monomers such as ethylene glycol di(meth)acrylate, diethylene glycol di(meth)acrylate, triethylene glycol di(meth)acrylate, butylene glycol di(meth)acrylate, trimethylolpropane di(meth)acrylate, trimethylolpropane tri(meth)acrylate, pentaerythritol di(meth)acrylate, hexanediol di(meth)acrylate, and oligoethylene di(meth)acrylate can also be used in combination.

The acrylic resin and polymerizable monomer are mixed so that the proportion of the resin is within a range from 5 to 75% by weight.

The photopolymerization initiator (B), which is not activated by irradiation with light with a wavelength of 420 nm or above, is preferably capable of curing the resin (A) even at room temperature by making the polymerization reaction proceed under irradiation with natural light and/or ultraviolet light, and is preferably chosen from photopolymerization initiators and ultraviolet curing agents. It can be confirmed by the following test whether the photopolymerization initiator (B) is not activated by irradiation with light with a wavelength of 420 nm or above. A liquid resin composition, which is prepared by adding 0.5 parts by weight of a photopolymerization initiator to be tested to 100 parts by weight of a resin selected from the group consisting of unsaturated resin, vinyl ester resin, vinyl urethane resin, and acrylic resin, and is dissolved by mixing with stirring sufficiently, and is irradiated with light from a 15 W fluorescent light at an irradiation distance of 30 cm; if the resin solution is not gelled at all within 30 minutes, it is not a photopolymerization initiator. Typical examples of the photopolymerization initiator (B) includes benzophenone, acetophenone, or derivatives thereof. As a commercially available product, Irgacure 651 (a product of Ciba Specialty Chemicals Inc.) can be used. Upon use, additives or fillers capable of controlling the viscosity, tackiness, and impregnation molding shrinkage may be incorporated into the resin (A) provided that they do not suppress the photo-reaction.

The amount of the photopolymerization initiator (B), which is not activated by irradiation with light with a wavelength of 420 nm or above, is preferably within a range from 0.01 to 10 parts by weight based on 100 parts by weight of the resin (A) selected from the group consisting of unsaturated resin, vinyl ester resin, vinyl urethane resin, and acrylic resin.

The thickener (C) containing a thermoplastic resin powder as an active component is, for example, a fine acrylic polymer powder, and commercially available products thereof include Zeon F301, F303, F320, F325, F340, F345, and F351. The amount oft he thickener is preferably within a range from 10 to 40 parts by weight based on 100 parts by weight of the resin (A).

The thermoplastic resin powder (C) used as the thickener is a fine acrylic polymer powder having an average particle diameter within a range from 0.1 $\mu$m to 0.5 mm, which can be obtained by polymerization (e.g., emulsion polymerization, suspension polymerization, etc.) of an acrylic polymerizable monomer to form a polymer and drying the polymer.

The polymerizable monomer used in the thickener is an acrylic monomer and is obtained, for example, by using (meth)acrylates such as methyl (meth)acrylate, ethyl (meth)acrylate, propyl (meth)acrylate, isopropyl (meth)acrylate, butyl (meth)acrylate, isobutyl (meth)acrylate, and cyclohexyl (meth)acrylate as an essential component, and optionally using it in combination with another polymerizable monomer capable of copolymerizing with the (meth)acrylates described above, and polymerizing the mixed solution of the monomers described above.

As the polymerizable monomer capable of copolymerizing, there can be used unsaturated monomers, for example, hydroxyl group-containing monomers such as hydroxyethyl (meth)acrylate, hydroxypropyl (meth)acrylate, and hydroxybutyl (meth)acrylate; and carboxyl group-containing monomers such as (meth)acrylic acid. Furthermore, other (meth)acrylates, aromatic monomers (e.g., styrene, a-methylstyrene, vinyl toluene, p-methylstyrene, chlorostyrene, etc.), vinyl esters (e.g., vinyl acetate, vinyl propionate, etc.), halogenated vinyl monomers (e.g., vinyl chloride, vinylidene chloride, etc.), and unsaturated nitriles (e.g., acrylonitrile, methacrylonitrile, etc.) can be used in combination.

Polyfunctional polymerizable monomers such as ethylene glycol di(meth)acrylate, diethylene glycol di(meth)acrylate, triethylene glycol di(meth)acrylate, butylene glycol di(meth)acrylate, trimethylolpropane di(meth)acrylate, trimethylolpropane tri(meth)acrylate, pentaerythritol di(meth) acrylate, hexanediol di(meth)acrylate, and oligoethylene di(meth)acrylate can also be used in combination in the polymer provided that the amount is preferably 0.5% by weight or less.

The method of preparing the thermoplastic resin powder (C) is not specifically limited, but is usually prepared by emulsion polymerization. That is, an emulsion is obtained by subjecting the polymerizable monomer component to emulsion polymerization using a peroxide initiator as the polymerization initiator and a redox initiator as the radical polymerization initiator in the presence of an emulsifier. An emulsion containing a particulate copolymer having a particle diameter within a range from 300 to 5000 angstroms is prepared by such emulsion polymerization.

A powdered copolymer is obtained by preferably spray-drying the emulsion containing the copolymer obtained by the emulsion polymerization using a multi-blade type rotary disc drier, disc type rotary drier, and a nozzle type drier. When drying, the copolymer agglomerates in units of spray liquid drops to preferably form agglomerates of about 20–100 $\mu$m in size. The agglomeration degree varies depending on the dried state, and the step of pulverizing after drying can also be provided. Agglomerates can be obtained by separating latex particles with solidifying using a salting-out method or a freezing method after the completion of the emulsion polymerization, dehydrating the latex particles to form a wet cake, and drying the wet cake on a fluidized bed.

The weight-average molecular weight of the thermoplastic resin powder (C) which can be used in the thickener is preferably 100,000 or more, more preferably within a range from 100,000 to 5,000,000, and particularly preferably from 200,000 to 3,5000,000.

Typical examples of the ultraviolet absorber (D) include derivatives of benzotriazole and triazine. Specific examples thereof include "TINUVIN 328", "TINUVIN 384", "TINUVIN 900", "TINUVIN 928", "TINUVIN 1130", and "TINUVIN 400" (all of which are manufactured by Ciba Specialty Chemicals Inc.).

Hindered amine derivatives can also be added as a photostabilizer in the see-through light absorbing film (ii) whose transmittance to light with a wavelength of 420 nm or below is 10% or less.

Furthermore, pigments/dyes having an absorption band of 600 nm or below, while having see-through characteristics can also be added to improve the stability of the compound during shaping to light.

100 parts by weight of inorganic fillers can be added to 100 parts by weight of the resin (A) selected from the group consisting of unsaturated polyester resin, vinyl ester resin, vinyl urethane resin, and acrylic resin as far as they do not drastically impair the transparency of the photocurable compound after thickening.

As the see-through light absorbing film (ii), whose transmittance to light with a wavelength of 420 nm or below is 10% or less, for example, there can be used a film prepared by mixing a thermoplastic resin such as polyethylene, polypropylene, polyester, or polyvinyl alcohol and the above ultraviolet absorber with melting and forming the mixture into a film, a film prepared by coating a thermoplastic resin film with a re-releasing adhesive incorporated with the ultraviolet absorber, and a film prepared by coating a thermoplastic resin film with a coating solution incorporated with the ultraviolet absorber and drying the film.

The thickness of the thermoplastic resin film is not specifically limited. In view of the operation properties during shaping and curing of the photocurable resin compound in the present invention, a film having a thickness within a range from 15 to 50 μm is used.

If the ultraviolet absorber is mixed with the thermoplastic resin film with melting, the ultraviolet absorber can be used in amount within a range from 0.01 to 10% by weight.

When using a light absorbing film (ii) with the adhesive incorporated with the ultraviolet absorber prepared by coating a thermoplastic resin film, an adhesive having re-releasability can be used as the adhesive.

The amount of the ultraviolet absorber to be added to the adhesive is within a range from 0.01 to 10% by weight based on the total weight of the adhesive.

When using a light absorbing film (ii) with the adhesive incorporated with the ultraviolet absorber prepared by coating the thermoplastic resin film, the coating composition is not specifically limited but a solvent type coating composition containing an acrylic polymer and a water-based coating composition such as an emulsion or dispersion can be used.

The amount of the ultraviolet absorber to be added to the coating composition is within a range from 0.01 to 10% by weight based on the solid content of the coating composition.

With respect the light absorbing film (ii), the ultraviolet absorber may be contained in any of the thermoplastic film, adhesive, and coating composition as far as the transmittance to light with a wavelength of 420 nm or below is 10% or less, and they can be used in combination.

The reinforcing fibers may be those which are usually used as reinforcing fibers, and examples thereof include glass fibers, polyester fibers, phenol fibers, polyvinyl alcohol fibers, aromatic polyamide fibers, nylon fibers, and carbon fibers. They can have forms including, for example, chopped strands, chopped strand mats, roving, and woven fabrics. The fiber reinforcement is selected considering the viscosity of the resin composition and strength of the resulting molded article. The amount of the fiber reinforcement (D) is preferably within a range from 20 to 30% by weight based on 100 parts by weight of the photocurable compound.

The photocurable compound is preferably formed into a sheet-like material by mixing with a mixture of the resin (A), photocuring agent (B), and thickener (C) containing the thermoplastic resin powder as the active component, and interposing the mixture into two thermoplastic films made of polyethylene, polypropylene, polyester, and polyvinyl alcohol thereby to fix the mixture to the films. As the thermoplastic resin film to be fixed, for example, a film subjected to a release treatment with silicon to make it readily releasable from the photocurable compound can be used. In this case, the surface which is subjected to the release treatment is placed on the surface of the photocurable compound. In such a case, it is necessary to use a thermoplastic film which is prepared by adding an ultraviolet absorber to film(s) on one or both surfaces or prepared by coating a thermoplastic resin film with a coating composition containing the ultraviolet absorber, the transmittance of which to light with a wavelength of 420 nm or below is 10% or less.

If the photocurable compound is fixed by using a thermoplastic film containing no ultraviolet absorber, it is possible to adhere a thermoplastic resin film coated with an adhesive containing no ultraviolet absorber to a thermoplastic resin film coated with an adhesive containing an ultraviolet absorber, or to additionally form an adhesive light absorbing layer coated with an adhesive at the back surface of a thermoplastic film coated with a coating composition containing an ultraviolet absorber.

When using the photocurable resin compound as a lining, a sheet-like material is preferably prepared by impregnating the fiber reinforcement with a mixture of the resin (A), photocuring agent (B), and thickener (C) containing the thermoplastic resin powder as the active component, and interposing the impregnated fiber reinforcement between two films made of polyethylene, polypropylene, polyester, and polyvinyl alcohol thereby to fix the impregnated fiber reinforcement to the films.

Also in this case, the light absorbing film (ii) with a desired construction can be formed by using the adhesive containing the ultraviolet absorber, thermoplastic resin film, and coating composition in combination, as described above.

The resulting photocurable resin compound can be stored in a continuous form or in the state of being wound around a cylindrical object such as a paper or iron roll, or stored in the state of being folded to a fixed length. Volatilization of the volatile monomer must be prevented by wrapping the resulting resin compound with a film, which does not transmit light, such as aluminum-deposited film.

The resulting photocurable resin compound is preferably cured to the stage B (or formed into a prepreg) at a temperature of 80° C. or lower, and is preferably thickened by heating to a temperature within a range from normal temperature to 50° C., more preferably from 30 to 45° C., to form a prepreg molding material containing no liquid.

The resulting photocurable resin compound can be adhered to the adherend by contact pressure after peeling off a protective film on one surface, and, if necessary, the operation of removing bubbles remaining between the compound and adherend can be conducted by applying a low pressure of about 1 kg/cm$^2$ using a roller.

When used as a waterproof sheet, the area of the adherend is very large (1 m$^2$ or more), and the compound is generally applied outdoors. However, the photocurable resin compound of the present invention is not cured even when allowed to stand outdoors all day on a sunny day when the photocurable resin compound is covered with a light absorbing film. In case of large-area application, partial curing can be prevented during the application by peeling off a light absorbing film at the edge portion of a first photocurable resin compound, overlapping the first photocurable resin compound and a second photocurable resin compound provided with a light absorbing film one upon another, and applying pressure using a roller thereby to integrate them and to remove bubbles between the sheets.

After closely adhering to the adherend, the light absorbing film is peeled off when necessary, and then the sheet-like photocurable resin compound is cured by irradiating with natural light (sunlight) or light from an ultraviolet lamp such as a high-pressure mercury lamp.

EXAMPLES

The following Examples further illustrate the present invention in detail.

Example 1

30 Parts by weight of an acrylic thickener ("ZEON F303", weight-average molecular weight: 3,000,000, average particle diameter: 1 μm, manufactured by Nippon Zeon Co., Ltd.) was added to 100 parts by weight of an unsaturated polyester resin ("POLYLITE FW-281" manufactured by Dainippon Ink and Chemicals, Inc.), followed by sufficient stirring. 1 Part by weight of Irgacure 651 (manufactured by Ciba Specialty Chemicals Inc.) as an ultraviolet curing agent was further added, and, after mixing with stirring, a glass chopped strand (1 inch) was impregnated with the mixture using an SMC manufacturing apparatus. Then, the impregnated glass chopped strand was interposed between a PET film having a film thickness of 16 µm and a light absorbing film made of PET having a film thickness of 16 µm, which was prepared by mixing 0.5% by weight of "TINUVIN 328" (manufactured by Ciba Specialty Chemicals Inc.) as a benzotriazole ultraviolet absorber with melting and forming the mixture into a film, and the resulting sheet was placed in a storage box while being folded. The transmittance of the ultraviolet absorber-containing light absorbing film made of PET to light with a wavelength of 420 nm or below was 4% or less. To prevent the styrene from volatilizing, the sheet is stored wrapped with an aluminum-deposited film. The resulting sheet was heated to 45° C., stored for two hours, and then thickened to prepare a photocurable resin compound. The photocurable resin compound had a sheet thickness of 1.2 mm and a glass content of 23%, and also had tackiness. However, the peeling of the protective film was good, and the resin component did not adhere to it.

After the resulting photocurable resin compound was cut into pieces of 100 cm×105 cm, two pieces thereof were applied to a porch made of concrete having an area of 2 m×1 m. In this case, a PET film containing no ultraviolet absorber of a first photocurable resin compound was peeled off, and the compound was closely adhered completely to the concrete surface by applying to the concrete while removing bubbles remaining between the concrete and sheet. The edge portion (5 cm) of an ultraviolet absorber-containing PET film as a light absorbing layer of the photocurable resin compound was peeled off, and a second photocurable resin compound whose PET film containing no ultraviolet absorber was peeled off was laid on the edge portion (5 cm), thereby to closely adhere with each other. The laminated portion was passed trough a roller thereby to make the thickness uniform, thus removing bubbles. It required about 30 minutes to closely adhere the two pieces of photocurable resin compound to the concrete surface as the adherend since the beginning of the application. The compound is not cured during the application while provided with the light absorbing film on a sunny day (in mid-May), and therefore the applicability was good.

After closely adhering the photocurable resin compound completely, the compound was converted into an non-sticky FRP cured article only by peeling off the PET film as the light absorbing layer and allowing the compound to stand for 20 minutes.

Example 2

In the same manner as in Example 1, except that a vinyl resin ("DION 9102-01NP" manufactured by Dainippon Ink and Chemicals, Inc.) was used in place of the unsaturated polyester resin, a photocurable resin compound was prepared. The operation properties of the resulting sheet were good, as in Example 1.

Example 3

In the same manner as in Example 1, except that an acrylic syrup obtained by polymerizing methyl methacrylate by bulk polymerization (polymerization degree of 30%) was used in place of the unsaturated polyester resin, a photocurable resin compound was prepared. The operation properties of the resulting sheet were good, as in Example 1.

Example 4

In the same manner as in Example 1, except that a vinyl urethane resin prepared by mixing 60 parts of vinyl urethane made from propylene glycol (molecular weight: 600), isophorone diisocyanate, and 2-hydroxyethyl methacrylate, and 40 parts of methyl methacrylate with melting was used in place of the unsaturated polyester resin, a photocurable resin compound was prepared. The operation properties of the resulting sheet were good, as in Example 1.

Example 5

In the same manner as in Example 1, except that the impregnated glass chopped strand was interposed between two PET films containing no ultraviolet absorber and a re-releasing PET film ("SOFTACK" manufactured by Dainippon Ink and Chemicals, Inc.) wherein "TINUVIN 328" (manufactured by Ciba Specialty Chemical Inc.) was added to the adhesive in the amount of 0.2% by weight based on 100 parts by weight of the adhesive was adhered onto the PET film on one surface in the preparation of the photocurable resin compound using an SMC machine, a photocurable resin compound was prepared. The transmittance of the re-releasing PET film to light with a wavelength of 420 nm or below was 3.8% or less.

When the sheet is applied to a concrete surface, the PET film on one surface is peeled off to thereby closely adhere the sheet, and bubbles are removed by using a roller. Curing is carried out by removing the re-releasing PET film with the adhesive while leaving the other PET film on the top surface. According to the method, the sheet is not cured even if the application time of three or more hours is required similar to Example 1, and the sheet is cured within about 30 minutes after peeling off the re-releasing PET film with the adhesive as the light absorbing layer. Since the other PET film is maintained while curing is carried out, styrene can be prevented from volatilizing on application, and there is very little styrene odor. Furthermore, a surface having good gloss can be obtained by peeling off the PET film after curing.

Example 6

In the same manner as in Example 1, except that the impregnated glass chopped strand was interposed between two PET films containing no ultraviolet absorber and a re-releasing PET film ("SOFTACK" manufactured by Dainippon Ink and Chemicals, Inc.) coated with an ultraviolet absorber-containing emulsion coating composition ("UVC UT100", manufactured by Nippon Technical Service Co.) in a thickness of 20 µm was adhered onto the PET film on one surface in the preparation of the photocurable resin compound using an SMC machine, a photocurable resin compound was prepared. The transmittance of the re-releasing PET film with a coating film to light with a wavelength of 420 nm or below was 0.4% or less.

When the sheet is applied to a concrete surface, the PET film on one surface is peeled off to thereby closely adhere the sheet, and bubbles are removed by using a roller. Curing is carried out by removing the re-releasing PET film with the adhesive while leaving the other PET film on the top surface. According to the method, the sheet is not cured even if the application time of three or more hours is required similar to Example 1, and the sheet is cured within about 30 minutes after peeling off the re-releasing PET film with the coating film as the light absorbing layer. Since the other PET film is maintained while curing is carried out, styrene can be prevented from volatilizing on application similar to Example 5, and there is very little styrene odor. Furthermore, a surface having good gloss can be obtained by peeling off the PET film after curing.

Comparative Example 1

A photocurable resin compound was prepared in the same manner as in Example 1, except that bis(2,4,6- trimethylbenzoyl)-phenylphosophine oxide ("IRGACURE" 819 manufactured by Ciba Specialty Chemicals Inc.) having an absorption band of 450 nm or below was used as an ultraviolet curing agent in place of Irgacure 651.

The resulting photocurable resin compound was subjected to an application test outdoors. However, the photocurable resin compound was cured after five minutes even while being provided with the light absorbing layer, and could not be sufficiently closely adhered to the concrete surface. Thus, portions of the applied surface peeled off, forming a space between the compound and concrete surface.

Comparative Example 2

A photocurable resin compound was prepared in the same manner as in Example 1, except that the amount of the ultraviolet absorber was 0.02% by weight based on the weight of PET. The transmittance of the light absorbing film to light was 45% at a wavelength of 420 nm, while the transmittance to light was 21% at a wavelength of 400 nm.

During the operation outdoors, the photocurable resin compound was cured within 15 minutes even while being provided with the light absorbing layer. The photocurable resin compound was not cured after 30 minutes in the shade, but there was a large difference in curability in the applied surface, and a warped surface portion was formed.

What is claimed is:

1. A photocurable resin compound sheet comprising a photocurable resin compound (i) containing as an essential component at least one unsaturated resin (A) selected from the group consisting of unsaturated polyester resin, vinyl ester resin, vinyl urethane resin, and acrylic resin, a photopolymerization initiator (B) which is not activated by irradiation with light with a wavelength of 420 nm or above, and a thickener (C) containing a thermoplastic resin powder as an active component; and a see-through light absorbing film (ii) whose transmittance to, light with a wavelength of 420 nm or below is 10% or less; said photocurable resin compound being covered with said see-through light absorbing film, wherein the resin compound is protected from light exposure to prevent photopolymerization and partial photo-curing of the resin compound, and wherein said photocurable resin compound (i) is prepared by combining said unsaturated resin (A), said photopolymerization initiator (B) and said thickener (C) in the absence of a photopolymerization initiator which is activated by irradiation with light with a wavelength of 420 nm or more.

2. A photocurable resin compound sheet according to claim 1, wherein said photocurable resin compound (i) contains a fiber reinforcement (E).

3. A photocurable resin compound sheet according to claim 1, wherein said thickener (C) containing a thermoplastic resin powder as an active component is a polymer powder obtained by polymerizing an acrylic monomer.

4. A photocurable resin compound sheet according to claim 1, wherein said thickener (C) containing a thermoplastic resin powder as an active component is a resin polymer powder having an average particle diameter within a range from 0.1 $\mu$m to 0.5 mm.

5. A photocurable resin compound sheet according to claimed 1, wherein said thickener (C) containing a thermoplastic resin powder as an active component has a weight-average molecular weight of 100,000 or more.

6. A photocurable resin compound sheet according to claim 1, wherein said see-through light absorbing film (ii) is a thermoplastic film containing an ultraviolet absorber (D).

7. A photocurable resin compound sheet according to claim 1, wherein said see-through light absorbing film (ii) is a film obtained by coating a thermoplastic film with a coating composition containing an ultraviolet absorber (D).

8. A photocurable resin compound sheet according to claim 1, wherein said see-through light absorbing film (ii) is composed of a re-releasing adhesive containing an ultraviolet absorber (D) and a thermoplastic film.

9. A photocurable resin compound sheet according to claim 1, wherein (a) said sheet is wound in a roll or folded to a fixed length, (b) said roll or folded sheet is wrapped with a film which does not transmit light, and (c) the wrapped roll or folded sheet is maintained at a temperature of 80° C. or lower to cure the resin to stage B.

10. A method of curing a photocurable resin compound, which comprises the steps of:

(a) providing a photocurable resin compound containing a photopolymerization initiator (B) and an unsaturated resin (A), (b) adhering the photocurable resin compound of step (a) to a substrate prior to shaping the compound, (c) shaping the photocurable resin compound of step (b) while it is provided with a see-through light absorbing film (ii), wherein said see-through light absorbing film (ii) is a thermoplastic film containing an ultraviolet absorber (D) in an amount sufficient to prevent natural light from activating said photopolymerization initiator (B) and curing said unsaturated resin (A), (d) removing said see-through light absorbing film (ii) from the photocurable resin compound of step (c), and (e) curing said photocurable resin compound of step (d) by irradiating with ultraviolet light and/or natural light.

11. A method of curing a photocurable resin compound, which comprises the steps of:

(f) providing a first photocurable resin compound containing a photopolymerization initiator (B) and an unsaturated resin (A), (g) adhering the first photocurable resin compound of step (f) to a substrate, (h) providing a second photocurable resin compound containing a photopolymerization initiator (B) and an unsaturated resin (A), (i) partially overlapping the photocurable resin compounds of steps (e and (h) one upon another while they are provided with a see-through light absorbing film (ii), thereby to integrate them, wherein said see-through light absorbing film (ii) is a thermoplastic film containing an ultraviolet absorber (D) in an amount sufficient to prevent natural light from activating said photopolymerization initiator (B) and curing said unsaturated resin (A), (j) removing said see-through light absorbing film (ii) from the photocurable resin compounds of step (i), and (k) curing said photocurable resin compounds of step (j) by irradiating with ultraviolet light and/or natural light.

12. A photocurable resin compound sheet comprising a photocurable resin compound (i) containing as an essential component at least one unsaturated resin (A) selected from the group consisting of unsaturated polyester resin, vinyl ester resin, vinyl urethane resin, and acrylic resin, a photopolymerization initiator (B) which is not activated by irradiation with light with a wavelength of 420 nm or above, and a thickener (C) containing a thermoplastic resin powder as an active component; and a see-through light absorbing film (ii) whose transmittance to light with a wavelength of 420 nm or below is 10% or less; said photocurable resin compound being covered with said see-through light absorbing film, wherein said see-through light absorbing film (ii) is a thermoplastic film containing an ultraviolet absorber (D) in an amount sufficient to prevent natural light from activating said photopolymerization initiator (B) and curing said unsaturated resin (A).

13. A photocurable resin compound sheet according to claim 12, wherein said photocurable resin compound (i) contains a fiber reinforcement (E).

14. A photocurable resin compound sheet according to claim 12, wherein said thickener (C) containing a thermoplastic resin powder as an active component is a polymer powder obtained by polymerizing an acrylic monomer.

15. A photocurable resin compound sheet according to claim 14, wherein said thickener (C) containing a thermoplastic resin powder as an active component has a weight-average molecular weight of 100,000 or more.

16. A photocurable resin compound sheet according to claim 12, wherein said thickener (C) containing a thermoplastic resin powder as an active component is a resin polymer powder having an average particle diameter within a range from 0.1 μm to 0.5 mm.

17. A photocurable resin compound sheet according to claim 12, wherein said see-through light absorbing film (ii) is a film obtained by coating a thermoplastic film with a coating composition containing an ultraviolet absorber (D).

18. A photocurable resin compound sheet according to claim 12, wherein said see-through light absorbing film (ii) is composed of a re-releasing adhesive containing an ultraviolet absorber (D) and a thermoplastic film.

\* \* \* \* \*